United States Patent [19]

Barraud et al.

[11] Patent Number: 4,632,800
[45] Date of Patent: Dec. 30, 1986

[54] PROCESS FOR PRODUCING A THIN FILM HAVING AT LEAST ONE MONOMOLECULAR LAYER OF NON-AMPHIPHILIC MOLECULES

[75] Inventors: André Barraud, Bures-sur-Yvette; Annie Ruaudel, Verriéres le Buisson; Michel Vandevyver, Chatenay Malabry, all of France

[73] Assignee: Commissariat a l'Energie Atomique, Paris, France

[21] Appl. No.: 732,279

[22] Filed: May 9, 1985

[30] Foreign Application Priority Data

May 10, 1984 [FR] France ................................ 84 07213

[51] Int. Cl.$^4$ .......................... B05D 1/20; B29C 41/00
[52] U.S. Cl. .................................... 264/298; 118/402; 427/402; 427/412.3; 427/434.3
[58] Field of Search ............. 264/298; 427/402, 412.3, 427/434.3; 118/402; 546/21, 313; 264/202, 212, 49

[56] References Cited

U.S. PATENT DOCUMENTS 3,031,721 5/1962 Friedlander .................... 264/212 X
4,511,604 4/1985 Barraud et al. ............... 427/434.3 X

FOREIGN PATENT DOCUMENTS 0116751 8/1984 European Pat. Off. .

OTHER PUBLICATIONS

Blodgett, K. B., "Films Built by Depositing Successive Monomolecular Layers on a Solid Surface", J. American Chemical Society, vol. 57, 1935, pp. 1007–1010.
Nature, vol. 301, Jan. 1983, pp. 125–129, Edigijus E. Uzgiris, et al.
Journal of Biological Chemistry, vol. 257, Jun. 1982, pp. 6440–6445, R. M. Weis, et al.

*Primary Examiner*—Donald E. Czasa
*Assistant Examiner*—Leo B. Tentoni
*Attorney, Agent, or Firm*—Oblon, Fisher, Spivak, McClelland & Maier

[57] ABSTRACT

Process for producing a film having at least one monomolecular layer of non-amphiphilic molecules.

This process comprises the following stages:

(a) combining non-amphiphilic molecules A, such as pyridine, with amphiphilic molecules B, such as a zinc porphyrin, in order to form a complex of molecules A and B;
(b) forming on the surface of the liquid a monomolecular layer of the thus obtained complex, and
(c) transferring the thus formed monomolecular layer to a rigid support.

Molecules A and B can form between them a charge transfer complex, e.g. TCNQ-alkyl pyridinium which makes it possible to obtain laminated structures of organic conductors.

14 Claims, No Drawings

PROCESS FOR PRODUCING A THIN FILM HAVING AT LEAST ONE MONOMOLECULAR LAYER OF NON-AMPHIPHILIC MOLECULES

BACKGROUND OF THE INVENTION

The present invention relates to a process for producing a thin film comprising at least one monomolecular layer of non-amphiphilic molecules.

It is pointed out that "amphiphilic" or "amphipathic" molecules are organic molecules having a hydrophobic part, i.e. a part having a repulsion for polar liquids such as water, and a hydrophilic part, i.e. a part having an affinity for polar liquids such as water.

As a result of these special characteristics, when amphiphilic molecules are placed on the surface of a liquid such as water, the molecules spread on the surface of the liquid and are oriented in such a way that their hydrophilic part is immersed in the water, whilst their hydrophobic part, generally constituted by a hydrocarbon chain, tends to move away therefrom, so that the axis of the chain becomes perpendicular to the water surface. If the cohesion forces between the molecules are adequate, these molecules remain grouped and limit their spread to a continuous monomolecular film having essentially the thickness of a molecule, which corresponds to a Langmuir film. Such films can be manipulated on the water surface and then deposited on a solid support after being compressed under an appropriate surface pressure, in accordance with the Langmuir Blodgett method described in J. of Am. Chem. Soc., vol. 57, 1935, pp. 1007–1010.

It is possible to use this method for depositing several monomolecular layers of the same or different type on a support. In this case the molecules of each of the layers all have the same orientation and films constituted by a group of such layers have interesting uses in electricity, electronics, etc., due to their special structure and their organization.

However, the formation of films from monomolecular layers using the Langmuir Blodgett method involves a special constitution of the molecules to be deposited namely the presence of hydrophobic and hydrophilic parts distributed in the molecule in such a way as to give only a single orientation thereto, when said molecules are dispersed on the surface of a polar liquid, such as water.

Moreover, it is not possible to use the Langmuir Blodgett method when it is wished to form films from non-amphiphilic molecules, i.e. molecules which cannot be oriented on the surface of a polar liquid, and other presently known methods do not make it possible to produce films constituted by monomolecular layers of non-amphiphilic molecules.

Thus, it is sometimes possible to organise non-amphiphilic molecules, i.e. polymer molecules, in the form of a monomolecular layer on the surface of a liquid, but it is not possible to transfer this layer to a support.

In the same way, condensation methods consisting of vacuum evaporation of the non-amphiphilic molecules to be deposited and then the condensation thereof on a support do not make it possible to bring about the deposit of molecules organised in the form of successive laminars parallel to the support. Thus, these methods only give a statistical deposit, and only supply a continuous polycrystalline film in the case of a deposit thickness of several hundred Å.

Adsorption methods consisting of bringing a support into the presence of non-amphiphilic molecules to be deposited and dispersed in a gas or dissolved in a solvent only make it possible to deposit a single complete layer, because the following layers are deposited statistically and have a precarious stability. Insertion methods consisting of inserting molecules between the laminars of a host material, such as graphite, can only be used with certain molecules and certain solid host materials. Moreover, the disengagement between the planes containing the inserted molecules is very poor, due to the thinness of the host laminars, which generally corresponds to an atomic monomolecular layer, which prevents certain subsequent uses of the inserted molecules.

SUMMARY OF THE INVENTION

The present invention relates to a process for producing a film having at least one monomolecular layer of non-amphiphilic molecules, obviating the disadvantages and inadequacies of the aforementioned processes.

The present invention therefore relates to a process for producing a thin film having at least one monomolecular layer of non-amphiphilic molecules A, wherein it comprises the following stages:

(a) combining said non-amphiphilic molecules A with amphiphilic molecules B to form a complex of molecules A and B, said amphiphilic molecules B being depositable on a support in the form of a monomolecular layer by the Langmuir Blodgett method, (b) forming on the surface of the liquid a monomolecular layer of the thus obtained complex, and (c) transferring the thus formed monomolecular layer to a rigid support.

According to the invention, it is possible in this way to deposit several monomolecular layers of the complex on the rigid support, in order to obtain a laminated structure, in which the non-amphiphilic molecules A are organized, confined and blocked between the successive monomolecular layers formed from the molecules B.

Thus, as a result of the combination of non-amphiphilic molecules A with amphiphilic molecules B, it is possible to form by the process of the invention monomolecular layers of non-amphiphilic molecules by using the Langmuir Blodgett method, so that it is more particularly possible to obtain a stack of monomolecular layers of non-amphiphilic molecules, which has hitherto been impossible.

These non-amphiphilic molecules A can then be freed from the complex which they form with the molecules B by subsequent chemical reactions, whilst retaining their structure organized in the form of monomolecular layers, due to the presence of the matrix of molecules B organized in the form of lamellar layers.

In addition, according to a variant of the invention, the process comprises a supplementary stage consisting of releasing into the monomolecular layer or layers deposited on the rigid support molecules A of the complex which they form with molecules B. This can be carried out chemically, e.g. by a managed diffusion of a strong ligand, such as $NH_3$ having a greater affinity for molecules B than for molecules A.

Thus, it is possible to isolate the layers of molecules A, which remain separated by layers of molecules B and obtain laminars of molecules A, which are disengaged from one another.

This constitutes an important advantage, because none of the aforementioned known processes makes it possible to organize non-amphiphilic molecules, in the form of successive, disengaged lamellar layers, having a predetermined, desired number of layers.

According to the invention, the amphiphilic molecules B are chosen in such a way as to have a physical, chemical or electrical affinity with respect to the molecules A, so that they can form a relatively stable complex therewith depositable in the form of monomolecular layers.

For example, when it is wished to deposit monomolecular layers of non-amphiphilic molecules such as pyridine, it is possible to use as molecules B metallic porphyrines, with which the pyridine can be associated by acting as the ligand.

When the non-amphiphilic molecules are e.g. biological proteins, it is possible to combine the latter with fatty acid molecules having a high affinity for proteins. When the non-amphiphilic molecule to be deposited is an acid, such as propiolic acid, it is possible to combine the same with organic amphiphilic ions, such as the (docosyl)$_4$ tetrapyridinium porphyrin ion.

When the non-amphiphilic molecules are electron donor or acceptor groups, it is possible to combine these with amphiphilic molecules constituted by electron donor or acceptor groups, in order to form a charge transfer complex.

It is pointed out that the charge transfer complexes are formed by the association of two molecules whereof one, C, acts as an electron acceptor and the other, D, as the electron donor. It is possible to represent this reaction in the following way:

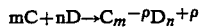

$$mC + nD \rightarrow C_m^{-p} D_n^{+p}$$

m and n representing the respective number of molecules, and $p$ the charge transfer corresponding to the proportion of electrons transferred.

If m=n, there is a simple stoichiometry and if m differs from n a complex stoichiometry. If $p$ is substantially equal to 0, the complex is a molecular complex in the neutral fundamental state. If $p$ is equal to 1, it is a true ionic compound with one electric charge per molecule D or C and if $p$ is less than 1, there are fewer electric charges than molecules. Thus, there is a mixed valence compound, which is a prerequisite for obtaining an organic conductor. A distinction can then be made between the following: 1. The true charge transfer complexes, in which there is a transfer of an electron from the donor to the acceptor, said single electrons then being located on $\pi$ orbitals ($\pi$-$\pi$ complex). 2. Radical ion salts in which only one of the ions is of a radical nature, the counter-ion being diamagnetic.

Complexes of this type are in particular described in Annales de Physique, 1976, vol. 1, no. 4-5, pp. 145-256 and in the Journal de Chimie Physique, 1982, 79, no. 4. These complexes can be prepared by direct oxidation reaction or by double exchange reaction on the basis of diamagnetic ionic salts.

Furthermore, for the deposition by the process of the invention of monomolecular layers formed from non-amphiphilic, electron donor or acceptor compounds, it is merely necessary to associate them in a charge transfer complex with amphiphilic, electron donor or acceptor compounds. This also makes it possible to produce films of conductive charge transfer complexes in the form of laminated layers, which could not be achieved hitherto.

In order to perform the process of the invention, it is possible to firstly prepare a complex of molecules A and B by known processes, followed by the dissolving of the molecules of the thus obtained complex in an appropriate solvent, after which a monomolecular layer is formed from the solution by the Langmuir method. In the case where molecules A and B are able to form a complex of the charge transfer type and like those described hereinbefore, the first stage is generally to synthesize the complex, followed by the dissolving thereof in order to deposit it in the form of a monomolecular layer by the Langmuir method.

It is also possible to directly form the complex in solution, e.g. by the preparation in stage A of the solution of the complex of molecules A and B by adding molecules A to a solution of molecules B. In this case, it is possible to use the thus obtained solution to form in stage B a monomolecular layer on the surface of a liquid using the Langmuir method.

It is also possible to directly form the complex of molecules A and B on the surface of the liquid, adding molecules A to the liquid and by dispersing a solution of molecules B on the liquid surface.

In the latter case, stages A and B are sometimes simultaneously performed, namely the preparation of the complex and the formation of a monomolecular layer thereof by firstly forming on the liquid surface a monomolecular layer of molecules B and by then injecting the molecules A into the liquid under the monomolecular layer formed. During the deposition of the monomolecular layer on the rigid support, the latter moves the dispersed molecules A into the liquid, so that a deposit of a monomolecular layer of the complex of molecules A and B is obtained.

The process according to the invention is applicable to all non-amphiphilic molecules able to combine by physical, chemical or electrostatic affinity with amphiphilic molecules B. The molecules A can in particular be molecules which can be associated with porphyrines or biological molecules.

The amphiphilic molecules B which can be used are molecules of an organic sulphur, nitrogen, phosphorus or oxygen compound having a long aliphatic or aromatic chain, e.g. compounds having on the one hand a hydrocarbon radical in the $C_{16}$ to $C_{30}$ position and on the other hand at least one function chosen from among the acid, alcohol, aldehyde, ketone, ether, amine, thiol, dione, thio-acid and thio-ether functions. These organic compounds can be aliphatic, cyclic or heterocyclic compounds optionally having one or more double and-/or triple bonds.

Examples of molecules B which can be used are:

fatty acids of formula R—COOH, with R representing a saturated or unsaturated, straight or branched hydrocarbon radical in the $C_{16}$ to $C_{30}$ position, such as stearic, behenic and arachic acid;

aliphatic or aromatic amines or their derivatives, e.g. amines of formula R—NH$_2$ in which R represents a saturated or unsaturated hydrocarbon radical in the $C_{16}$ to $C_{30}$ position phenanthrolines, porphyrines, metalloporphyrines, pyridines, bipyridines, etc.;

alcohols of formula R—CH$_2$OH in which R is a straight or branched saturated or unsaturated hydrocarbon radical having 16 to 30 carbon atoms;

phosphorus compounds, such as organic polyphosphates and polyphosphonates.

The supports used in the invention for the deposition of monomolecular layers are rigid supports, having an adequate affinity with respect to at least one of the molecules A and B to be deposited. The support can e.g. be made from glass, quartz, $CaF_2$, plastic, or metal such as aluminium, stainless steel, nickel, copper, etc.

In the process according to the invention, use is made of the known Langmuir Blodgett method for preparing the monomolecular layers of molecules A and B on the surface of a liquid, followed by deposition on a rigid support. The liquid of the trough is a polar liquid, generally water, and the layers are compressed under an appropriate surface pressure by using conventional means, e.g. a movable slide or rule, or cylindrical parts, like those described in French Pat. No. 2341 199, filed on Feb. 11, 1976 by the Commissariat A l'Energie Atomique.

The following examples are given in a nonlimitative manner for illustrating the invention.

EXAMPLE 1

Monomolecular layer based on pyridine

In this example, the non-amphiphilic molecules A are pyridine molecules and the amphiphilic molecules B are zinc porphyrin molecules.

The zinc porphyrin is firstly dissolved in chloroform, so as to obtain a solution containing $5.10^{-5}$ mol.l$^{-1}$ of porphyrin. To the solution is then added 5% by volume of pyridine in order to form the pyridine—zinc porphyrin complex. The thus obtained solution is spread on the water in the Langmuir trough and the uncomplexed pyridine excess passes into the water. This is followed by the compression of the monomolecular layer formed on the surface of the water at a pressure of 35 mN/m and it is then transferred to a solid $CaF_2$ support. Following deposition of the support, visible spectroscopy is used for checking that the pyridine has indeed been transferred to the solid support, which is revealed by the displacement of the Soret porphyrine band.

If it is wished to release pyridine molecules deposited in monomolecular layers on the support, they can be released in situ from the complex by the planned diffusion of a strong ligand, such as ammonia.

EXAMPLE 2

Monomolecular layer containing proteins

In this case, the molecules A are molecules of biological protein and they are deposited in the form of monomolecular layers after complexing them with molecules B constituted by behenic acid.

In this example, the biological proteins are constituted by extracts of cellular membranes from a photosynthetic bacterium, namely chromatophores of *Rhodopseudomonas Sphaeroides GA*.

Firstly a behenic acid solution is formed in the chloroform, containing $5.10^{-4}$ mol.l$^{-1}$ of behenic acid and this solution is spread on the surface of the water of a Langmuir trough, so as to form a monomolecular layer which is compressed at 35 mN/m.

A concentrated solution of the extracts of cellular membranes is then injected through the behenic acid film beneath the surface of the water using a curved needle syringe, followed by the deposition of the monomolecular layer on a quartz support. By optical or infrared spectroscopy, it can be found that the behenic acid layer has entrained with it an underlying cellular membrane layer which remains organized following deposition.

The formation of such a monomolecular layer of protein is interesting, due to its organized structure, for the study of the properties of various components of the cellular membrane, such as dyes, proteins, unsaturated molecules, etc.

EXAMPLE 3

Monomolecular layers formed from propiolic acid

In this case, the molecules A are propiolic acid molecules and the amphiphilic molecules B are (docosyl)$_4$ tetrapyridinium prophyrin bromide molecules.

Firstly a chloroform solution containing $5.10^{-5}$ mol.l$^{-1}$ of (docosyl)$_4$ tetrapyridinium porphyrin bromide and propiolic acid is added to the water of a Langmuir trough, so as to obtain a bath having a propiolic acid concentration of $10^{-3}$ mol.l$^{-1}$. The chloroform solution is then spread on the surface of the bath, so as to form a monomolecular layer which is compressed under a pressure of 35 mN/m and said layer is transferred to a $CaF_2$ support. Several layers are then deposited on the support and infrared spectrophotometry is used for checking for the presence of propiolate on the deposited monomolecular layers.

This is revealed by infrared spectrophotometry of the carboxylate function and of the propiolate triple bond. Thus, (docosyl)$_4$ tetrapyridinium porphyrin bromide has exchanged its bromide ions for propiolic ions. The thus coated support can be used for e.g. studying the chemistry of the triple bond in the solid state.

EXAMPLE 4

Monomolecular layers of an alkyl quinoliniumtetracyanoquinodimethane (TCNQ) charge transfer complex.

In this case, the molecules A are constituted by TCNQ and the molecules B by molecules of N-$C_{22}H_{45}$-quinolinium. The TCNQ - alkyl quinolinium complex is firstly synthesized from the corresponding alkyl quinolinium iodide and TCNQ lithium salt in an alcoholic medium. The complex obtained is purified by washing with ether and is recrystallized. It is then dissolved in chloroform, to obtain a solution containing $1.10^{-3}$ mol.l$^{-1}$ of the complex, and it spread on to the surface of the water in a Langmuir trough. This leads to the formation of a monomolecular layer which is compressed at 30 mN/m and is then deposited on a $CaF_2$ support. By infrared absorption of the TCNQ triple bonds, it is possible to check for the presence of said TCNQ in the deposited layers.

EXAMPLE 5

TCNQ-alkyl pyridinium molecular layers

In this case, the molecules A are TCNQ and the molecules B an alkyl pyridinium. As in Example 4 the TCNQ-alkyl pyridine complex is firstly prepared and it is then dissolved in chloroform to obtain a complex concentration of $1.10^{-3}$ mol.l$^{-1}$. A monomolecular layer of the complex is then formed as in Example 4, followed by compression of the layer under 27 mN/m and it is then deposited on a $CaF_2$ substrate.

The results obtained by using different alkyl pyridiniums, namely
N-$C_{18}H_{37}$-pyridinium
N-$C_{20}H_{41}$-pyridinium
N-$C_{22}H_{45}$-pyridinium
confirms the presence of TCNQ in the deposited layers. It is pointed out that TCNQ alone cannot be deposited in monomolecular layer form by the Langmuir Blodgett method. Thus, when it is deposited on the surface of the water from a solution, it collects in the form of crystals having geometrical facets dispersed on the surface, and consequently does not form a film.

What is claimed is:

1. A process for producing a thin film having at least one monomolecular layer of nonamphiphilic molecules A, which comprises the steps of:
    (a) combining said non-amphiphilic molecules A with amphiphilic molecules B thereby forming a complex of molecules A and B, said amphiphilic molecule B being depositable on a support in the form of the monomolecular layer by the Langmuir-Blodgett method;
    (b) forming on the surface of the liquid employed in the Langmuir-Blodgett technique a monomolecular layer of the thus obtained complex; and
    (c) transferring the thus formed monomolecular layer to a rigid support.

2. The process according to claim 1, wherein in stage A, a solution of the complex of molecules A and B is prepared by adding the molecules A to a solution of molecules B.

3. The process according to claim 2, wherein, in stage B use is made of the solution obtained in stage A to form a monomolecular layer on the surface of said liquid by the Langmuir Blodgett method.

4. The process according to claim 1, wherein the complex of molecules A and B is formed on the surface of said liquid by adding molecules A thereto and by dispersing on the surface of said liquid a solution of molecules B.

5. The process according to claim 1, wherein the molecules A are molecules of electron acceptor compounds, and the molecules B are molecules of amphiphilic electron donors able to combine with the molecules A to form a charge transfer complex.

6. The process according to claim 4, wherein the molecules A are molecules of tetracyanoquinodimethane (TCNQ) and the molecules B are alkyl pyridinium molecules.

7. The process according to claim 2, wherein the molecules A are molecules which can be associated with porphyrines.

8. The process according to claim 4, wherein the molecules A are biological molecules.

9. The process according to claim 8, wherein the molecules B are fatty acid molecules.

10. The process according to claim 7 or 8, wherein the molecules B are molecules of porphyrin or porphyrin derivatives.

11. The process according to claim 4, wherein a monomolecular layer of molecules B is initially formed on the surface of the liquid, and the molecules A are injected into the liquid beneath the monomolecular layer formed.

12. The process according to claim 1, which further comprises:
    releasing molecules A from their complex with molecules B in the monomolecular layer or layers of the complex deposited on the rigid support.

13. The process according to claim 1, wherein the molecules B are molecules of an organic compound having, on the one hand, a hydrocarbon radical of 16–30 carbon atoms, and on the other hand, at least one functional group selected from the group consisting of acid, alcohol, aldehyde, ketone, ether, amine, thiol, thione, thio-acid and thio-ether functional groups.

14. The process according to claim 1, wherein said rigid support is glass, quartz, $CaF_2$, plastic or metal.

* * * * *